United States Patent
Segawa et al.

(10) Patent No.: US 7,153,893 B2
(45) Date of Patent: Dec. 26, 2006

(54) HIGHLY GAS-RESISTANT, FIXABLE AND BRONZING CONTROLLABLE INK COMPOSITION, AND RECORDING METHOD AND RECORDED MATTER USING THE INK COMPOSITION

(75) Inventors: Hiroaki Segawa, Nagano-ken (JP); Tsuyoshi Sano, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 253 days.

(21) Appl. No.: 10/688,837

(22) Filed: Oct. 17, 2003

(65) Prior Publication Data

US 2004/0176497 A1    Sep. 9, 2004

(51) Int. Cl.
C09D 11/10 (2006.01)
C08L 25/10 (2006.01)
C08L 9/06 (2006.01)
C08L 9/08 (2006.01)
C08L 81/00 (2006.01)

(52) U.S. Cl. ............... 523/160; 524/571; 524/577; 524/609

(58) Field of Classification Search ............. 523/160, 523/161; 524/571, 577, 609
See application file for complete search history.

(56) References Cited

U.S. PATENT DOCUMENTS

| | | | |
|---|---|---|---|
| 5,919,294 A * | 7/1999 | Hirasa et al. | 106/31.9 |
| 6,087,416 A * | 7/2000 | Pearlstine et al. | 523/160 |
| 6,124,376 A * | 9/2000 | Nichols et al. | 523/160 |
| 6,245,832 B1 * | 6/2001 | Suzuki et al. | 523/160 |
| 6,274,646 B1 * | 8/2001 | Watanabe et al. | 523/161 |
| 6,666,553 B1 * | 12/2003 | Han-Adebekun et al. | 347/101 |
| 2001/0023265 A1 * | 9/2001 | Hidaka et al. | 523/161 |
| 2004/0024086 A1 * | 2/2004 | Segawa et al. | 523/160 |
| 2004/0030002 A1 * | 2/2004 | Tsuru et al. | 523/160 |

FOREIGN PATENT DOCUMENTS

| EP | 1153992 A1 * | 11/2001 |
|---|---|---|
| EP | 1203797 A1 * | 5/2002 |
| JP | 11217525 | 8/1999 |

* cited by examiner

*Primary Examiner*—Callie Shosho
(74) *Attorney, Agent, or Firm*—Ladas and Parry LLP

(57) ABSTRACT

It is an object of the present invention to provide an ink composition with excellent gas resistance, fixability, and bronzing resistance, as well as a recording method and recorded matter in which this ink composition is used. The present invention achieves this object by means of an ink composition in which a pigment is dispersed in a solvent, and a copolymer, which contains structural units originating in an aromatic compound monomer and structural units originating in a $C_5$ or higher diene compound and/or structural units originating in a non-diene compound, is included, wherein the copolymer has a sulfonic acid group, and the proportion of structural units originating in the aromatic compound monomer is 30 to 60 wt % with respect to the weight of the copolymer (100 wt %). In the present invention, styrene, α-methylstyrene, o-methylstyrene, p-methylstyrene, m-methylstyrene, chlorostyrene, or vinyl benzoate is selected as the above-mentioned aromatic compound monomer.

18 Claims, No Drawings

HIGHLY GAS-RESISTANT, FIXABLE AND BRONZING CONTROLLABLE INK COMPOSITION, AND RECORDING METHOD AND RECORDED MATTER USING THE INK COMPOSITION

BACKGROUND OF THE INVENTION

1. Field of the Invention

The present invention relates to an ink composition and to a recording method and recorded matter in which this ink composition is used, and more particularly relates to an ink composition with excellent gas resistance, fixability, and bronzing resistance.

2. Description of the Related Art

One type of ink used in ink jet printers is pigment-based inks in which a pigment is used as a colorant for the purpose of enhancing resistance to light and water. However, these pigment-based inks do not have adequate fixability with respect to paper or OHP, and it has also been indicated that there is room for improvement in terms of the water resistance of the printed matter, printing characteristics, ink bleeding, and so forth.

In view of this, and in an effort to solve the above problems, a water-based ink has been disclosed in Japanese Patent Application Laid-open No. H 11-217525, for example, in which ink bleeding, water resistance, and fixability are improved by sulfonating a diene-based (co)polymer whose essential component is a diene monomer, and emulsifying and dispersing this along with water in the presence of a dye or pigment (Patent Document 1).

However, if a recording medium having an ink accepting layer is used as special ink jet paper, then problems encountered with conventional ink compositions in solid printing include a phenomenon in which reflectivity varies with the printing duty, a phenomenon in which cyan solid printing takes on a reddish look (hereinafter referred to as "bronzing"), and inadequate fixability of the ink composition.

Also, printed matter produced using an ink composition is sometimes left outdoors, where it is exposed not only to sunlight but also to other types of light and to the atmosphere (which includes ozone, nitrogen oxides, sulfur oxides, and so forth). Accordingly, it is preferable for an ink composition to have excellent resistance to light and gases.

In view of this, the present invention was conceived in order to solve the problems encountered with the above-mentioned prior art, and it is an object thereof to provide an ink composition with excellent bronzing resistance, gas resistance, and fixability.

It is a further object of the present invention to provide a recording method and printed matter in which the above-mentioned ink composition is used.

SUMMARY OF THE INVENTION

As a result of diligent research aimed at solving the above problems, the inventors learned that the gas resistance, fixability, and bronzing resistance of an ink composition can be improved by specifying the type and amount of resin used in an ink composition that contains a copolymer having a sulfonic acid group, produced by copolymerizing an aromatic compound monomer and a $C_5$ or higher diene compound and/or a non-diene compound. The objects of the present invention are achieved by an ink composition in which a pigment is dispersed in a solvent, and comprising a copolymer that contains structural units originating in an aromatic compound monomer and structural units originating in a $C_5$ or higher diene compound and/or structural units originating in a non-diene compound, wherein the copolymer has a sulfonic acid group, and the proportion of structural units originating in the aromatic compound monomer is 30 to 60 wt % with respect to the weight of the copolymer (100 wt %).

The above constitution yields an ink composition with improved gas resistance, fixability, and bronzing resistance.

In a preferred aspect of the present invention, the above-mentioned ink composition is characterized in that the aromatic compound monomer is selected from the group consisting of styrene, α-methylstyrene, o-methylstyrene, p-methylstyrene, m-methylstyrene, chlorostyrene, and vinyl benzoate.

In a preferred aspect of the present invention, the above-mentioned ink composition is characterized in that the copolymer is contained as an emulsion.

In a preferred aspect of the present invention, the above-mentioned ink composition is characterized in that the non-diene compound is an acrylic compound.

In a preferred aspect of the present invention, the above-mentioned ink composition is characterized in that the pigment is dispersed in a solvent by a macromolecular compound having a carboxyl group.

In a preferred aspect of the present invention, the above-mentioned ink composition is characterized in that the macromolecular compound having a carboxyl group is a styrene-acrylic acid resin.

In a preferred aspect of the present invention, the above-mentioned ink composition is characterized in further containing a 1,2-alkanediol.

In a preferred aspect of the present invention, the above-mentioned ink composition is characterized in that the 1,2-alkanediol is 1,2-hexanediol.

In a preferred aspect of the present invention, the above-mentioned ink composition is characterized in that the 1,2-alkanediol is contained in an amount of 1 to 15 wt %.

In a preferred aspect of the present invention, the above-mentioned ink composition is characterized in further containing a polyether-modified organosiloxane compound.

In a preferred aspect of the present invention, the above-mentioned ink composition is characterized in that the polyether-modified organosiloxane compound is expressed by the following formula:

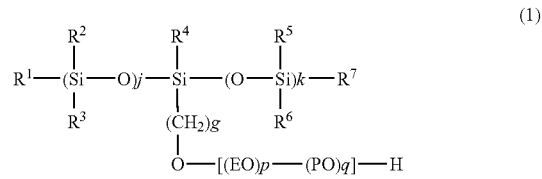

(1)

(where $R^1$ to $R^7$ are each independently a $C_1$ to $C_6$ alkyl group, j, k, and g are each independently an integer greater than or equal to 1, EO is an ethyleneoxy group, PO is a propyleneoxy group, p and q are integers greater than or equal to 0, p+q is an integer greater than or equal to 1, and EO and PO may be random or block regardless of their order within the brackets).

In a preferred aspect of the present invention, the above-mentioned ink composition is characterized in further containing an alkyl ether of a polyhydric alcohol.

In a preferred aspect of the present invention, the above-mentioned ink composition is characterized in that the alkyl ether of a polyhydric alcohol is selected from the group consisting of ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether.

In a preferred aspect of the present invention, the above-mentioned ink composition is characterized in that the alkyl ether of a polyhydric alcohol is triethylene glycol monobutyl ether.

In a preferred aspect of the present invention, the above-mentioned ink composition is characterized in further containing an acetylene glycol-based surfactant.

In a preferred aspect of the present invention, the above-mentioned ink composition is characterized in that the acetylene glycol-based surfactant is expressed by the following formula:

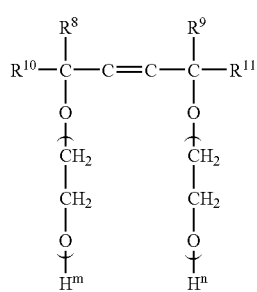

(2)

(where $0 \leq m+n \leq 50$, and $R^8$ to $R^{11}$ are each independently an alkyl group).

The above-mentioned objects are also achieved by a recording method, comprising the step of applying the above-mentioned ink composition to a recording medium so as to form an image.

The above-mentioned objects are also achieved by recording matter produced by forming an image by applying the above-mentioned ink composition to a recording medium.

DESCRIPTION OF THE PREFERRED EMBODIMENTS

As discussed above, the copolymer contained in the ink composition of the present invention is a copolymer having a sulfonic acid group and containing structural units originating in an aromatic compound monomer and structural units originating in a $C_5$ or higher diene compound (hereinafter referred to as "diene-based sulfonic acid group-containing copolymer"), or is a copolymer having a sulfonic acid group and containing structural units originating in an aromatic compound monomer and structural units originating in a non-diene compound (hereinafter referred to as "non-diene-based sulfonic acid group-containing copolymer"), and as mentioned above, contains 30 to 60 wt % structural units originating in an aromatic compound monomer. The diene-based sulfonic acid group-containing copolymer may contain structural units originating in a non-diene compound, and the non-diene-based sulfonic acid group-containing copolymer may contain structural units originating in a diene compound. This copolymer can be obtained, for example, by sulfonating a copolymer obtained by copolymerizing the monomers listed below (see, for example, Japanese Laid-Open Patent Application H11-217525), or by polymerizing or copolymerizing a sulfonated monomer.

Examples of the aromatic compound monomer used to obtain the above-mentioned diene- or non-diene-based sulfonic acid group-containing copolymer include styrene, α-methylstyrene, o-methylstyrene, p-methylstyrene, m-methylstyrene, chlorostyrene, and vinyl benzoate. The use of styrene is particularly favorable. These monomers can be used singly or in combinations of two or more types.

The content of structural units originating in an aromatic compound monomer is 30 to 60 wt %, and preferably 40 to 60 wt %, with respect to the weight of the above-mentioned copolymer (100%). The effect of the present invention cannot be obtained if the content of these units pertaining to an aromatic compound monomer is less than 30 wt %, but if the amount of polymerization of aromatic compound monomer is over 60 wt %, it may be difficult to form a film at normal temperature, creating problems with fixability, and optical stability also may decrease, creating problems with light resistance.

In addition to the above-mentioned structural units originating in an aromatic compound monomer, the above-mentioned diene-based sulfonic acid group-containing copolymer also contains structural units originating in a $C_5$ or higher diene compound monomer.

Examples of the above-mentioned diene compound monomer include $C_5$ to $C_{10}$ diene compounds, such as 1,3-pentadiene, 1,2-pentadiene, 2,3-pentadiene, isoprene, 1,2-hexadiene, 2,3-hexadiene, 1,4-hexadiene, 1,5-hexadiene, 2,3-hexadiene, 2,4-hexadiene, 2,3-dimethyl-1,3-butadiene, 2-ethyl-1,3-butadiene, 1,2-heptadiene, 1,3-heptadiene, 1,4-heptadiene, 1,5-heptadiene, 1,6-heptadiene, 2,3-heptadiene, 2,5-heptadiene, 3,4-heptadiene, 3,5-heptadiene, and cycloheptadiene. These diene compound monomers can be used singly or in combinations of two or more types.

In addition to aromatic compound monomers and diene-based monomers, other monomers can be used along with these to obtain the above-mentioned diene-based sulfonic acid group-containing copolymer, and examples of such other monomers include methyl (meth)acrylate, ethyl (meth)acrylate, butyl (meth)acrylate, and other such (meth)acrylic acid alkyl esters; (meth)acrylic acid, crotonic acid, maleic acid, itaconic acid, and other such mono- and dicarboxylic acids and dicarboxylic anhydrides; (meth)acrylonitrile and other such vinylcyan compounds; and vinyl chloride, vinylidene chloride, vinyl methyl ketone, vinyl acetate, (meth)acrylamide, glycidyl (meth)acrylate, and other such unsaturated compounds. These monomers can be used singly or in combinations of two or more types.

When these monomers are used concurrently, the amount in which the diene-based monomer is used should be at least 0.5 wt %, and preferably at least 1 wt %, and even more preferably at least 5 wt %.

The diene-based sulfonic acid group-containing copolymer can be manufactured by copolymerizing the above-mentioned aromatic compound monomer, diene compound monomer, and, if needed, monomers that can be used concurrently with these, to obtain a copolymer (hereinafter referred to as "diene-based copolymer"), and then sulfonating this copolymer. The above-mentioned diene-based copolymer is obtained by copolymerizing the above-mentioned monomers in the presence of a radical polymerization initiator such as hydrogen peroxide, benzoyl peroxide, or azobisisobutyronitrile, or water, or an anionic polymerization initiator such as n-butyllithium, sodium naphthalene, or metallic sodium, and, if needed, using a known solvent.

The above-mentioned diene-based sulfonic acid group-containing copolymer may be any type of copolymer, including both random copolymers and block copolymers. Preferred copolymers include isoprene-styrene random copolymers, isoprene-styrene block copolymers, and styrene-isoprene-styrene ternary block copolymers. Of these, isoprene-styrene block copolymers and styrene-isoprene-styrene ternary block copolymers are preferable.

The diene-based sulfonic acid group-containing copolymer used in the present invention can be obtained by hydrogenating all or part of the remaining double bonds of the above-mentioned diene-based copolymer and/or a precursor monomer thereof to obtain a (co)polymer, and sulfonating this by a known sulfonation method, such as the method discussed in *Shin Jikken Koza* [New Experiment Lectures], edited by the *Nihon Kagaku-kai* [J. Chem. Soc.] (14 Vol. III, p. 1773) or in Japanese Laid-Open Patent Application H2-227403. The above-mentioned hydrogenation may also be performed after sulfonation.

Examples of sulfonation agents include sulfuric anhydride, sulfuric acid, chlorosulfonic acid, fuming sulfuric acid, hydrogensulfites (such as salts of lithium, sodium, potassium, rubidium, or cesium).

The amount of sulfonation agent, calculated as sulfuric anhydride, is preferably 0.005 to 1.5 mol, and even more preferably 0.01 to 1.0 mol, per mole of the above-mentioned copolymer.

The sulfonated diene-based sulfonic acid group-containing copolymer thus obtained is then subjected to the action of water and/or a basic compound. Examples of basic compounds include hydroxides of alkali metals, alkoxides of alkali metals, carbonates of alkali metals, aqueous ammonia, organometal compounds, and amines. These basic compounds can be used singly or in combinations of two or more types. The amount of basic compound used should be no more than 2 mol, and preferably no more than 1.3 mol, per mole of the sulfonation agent being used.

As mentioned above, the diene-based sulfonic acid group-containing copolymer can also be obtained by polymerizing or copolymerizing a sulfonated monomer.

Meanwhile, the non-diene-based sulfonic acid group-containing copolymer used in the present invention contains structural units originating in a non-diene compound in addition to the above-mentioned structural units originating in an aromatic compound monomer. The non-diene-based monomer is, for example, preferably an acrylic compound monomer or a monomer having a sulfonyl group.

Examples of monomers having a sulfonyl group include vinyl monomers such as allylsulfonic acid, vinylsulfonic acid, or methacrylsulfonic acid obtained by reacting isobuytlene and sulfur trioxide; styrene-based monomers such as sodium p-styrenesulfonate (such as Spiromer [uncertain spelling] made by Tosoh); monomers having a sulfonyl group such as a methacrylic ester monomer expressed by the general formula $CH_2=C(CH_3)-COO(AO)_nSO_3Na$ (A: lower alkylene group) (such as Eleminol RS-30 made by Sanyo Chemical); and sodium salts, potassium salts, lithium salts, and so on of these monomers.

Examples of acrylic compound monomers include butyl acrylate, 2-ethylhexyl acrylate, β-methacryloyloxyethyl hydrogenphthalate, N,N-dimethylaminoethyl acrylate, and other such acrylic ester monomers; 2-ethylhexyl methacrylate, methoxydiethylene glycol methacrylate, methoxypolyethylene glycol methacrylate, methyl methacrylate, ethyl methacrylate, butyl methacrylate, N,N-dimethylaminoethyl methacrylate, glycidyl methacrylate, and other such methacrylic ester monomers; and acrylonitrile, methacrylonitrile, and other such vinyl cyanide compounds. Of these, methyl methacrylate and acrylonitrile are preferable.

The non-diene-based sulfonic acid group-containing copolymer may further contain structural units originating in vinyl ester compounds such as vinyl acetate, conjugated double bond compounds such as isoprene, 4-methyl-1-pentene and other α-olefin compounds, silicon-modified monomers, macromonomers, and so forth.

When a monomer having no sulfonyl group is used as the non-diene compound, sulfonation is performed after copolymerization. This sulfonation can be carried out according to the method described above for manufacturing a diene-based sulfonic acid group-containing copolymer.

The non-diene-based sulfonic acid group-containing copolymer obtained by copolymerizing a non-diene compound monomer may be any type of copolymer, including both random copolymers and block copolymers.

The non-diene-based sulfonic acid group-containing copolymer [is prepared], for example, by subjecting the above-mentioned aromatic compound monomer and non-diene compound monomer to radical polymerization using a radical polymerization initiator, chain transfer agent, or the like, in a polymerization solvent such as water or an organic solvent.

Examples of polymerization organic solvents used for radical polymerization include methanol, ethanol, isopropanol, and other such alcohols; xylene, toluene, benzene, and other such aromatic hydrocarbons; and butane, pentane, hexane, cyclohexane, heptane, and other aliphatic hydrocarbons. Of these polymerization solvents, water and methanol are preferred.

Examples of radical polymerization initiators include potassium peroxide, sodium persulfate, ammonium persulfate, and other such persulfate-based initiators, hydrogen peroxide, and other such inorganic initiators; and organic initiators typified by cumene hydroperoxide, isopropylbenzene hydroperoxide, paramethane hydroperoxide, benzoyl peroxide, and other such organic peroxides, and azobisisobutyronitrile and other such azo-based initiators.

The diene- or non-diene-based sulfonic acid group-containing copolymer used in the ink composition of the present invention has a weight average molecular weight, calculated as polystyrene (hereinafter referred to as "Mw"), of 1,000 to 100,000, and preferably 3,000 to 50,000, and even more preferably 5,000 to 20,000. The binder function of the ink will decrease if Mw is less than 1,000, which may create problems with fixability, but if Mw is over 100,000, this may lead to problems such as a loss of storage stability or discharge stability of the ink composition.

The diene- or non-diene-based sulfonic acid group-containing copolymer used in the ink composition of the present invention is preferably used in the form of an emulsion in water. This emulsification can be accomplished by stirring and mixing an organic solvent solution (that either has or has not undergone neutralization with water and/or a basic compound) with water and/or a basic compound to emulsify the components, and then removing the organic solvent while leaving behind the water.

The content of the diene- or non-diene-based sulfonic acid group-containing copolymer used in the ink composition of the present invention in the ink composition is preferably 0.1 to 20 wt %, and even more preferably 0.2 to 10 wt %. Below 0.1 wt %, there may be the problem of inadequate abrasion resistance, but over 20 wt % the viscosity of the ink composition may be over the viscosity that is optimal for an ink jet head, or discharge stability may be inferior.

The ink composition of the present invention contains the above-mentioned diene- or non-diene-based sulfonic acid group-containing copolymer, a pigment, and a solvent, and it is particularly favorable for it to be used as a water-based ink composition.

There are no particular restrictions on the pigment used in the present invention, and both inorganic and organic pigments can be used. Inorganic pigments that can be used include titanium oxide and iron oxide, as well as carbon black manufactured by a known method such as a contact process, furnace process, or thermal process.

Examples of organic pigments include insoluble azo pigments, condensed azo pigments, azo lakes, chelate azo pigments, and other such azo pigments, phthalocyanine pigments, perylene and perinone pigments, anthraquinone pigments, quinacridone pigments, dioxane pigments, thioindigo pigments, isoindolinone pigments, quinophthalone pigments, and other such polycyclic pigments, dye chelates (such as basic dye chelates and acid dye chelates), nitro pigments, nitroso pigments, aniline black, fluorescent pigments, and other such organic pigments. The above pigments can be used singly or in combinations of two or more types.

Specific examples of pigments include the following. Carbon blacks include No. 2300, No. 900, HCF88, No. 33, No. 40, No. 45, No. 52, MA7, MA8, MA100, No. 2200B, and so forth made by Mitsubishi Chemical, Raven 5750, Raven 5250, Raven 5000, Raven 3500, Raven 1255, Raven 700, and so forth made by Columbia, Regal 400R, Regal 330R, Regal 660R, Mogul L, Mogul 700, Monarch 800, Monarch 880, Monarch 900, Monarch 1000, Monarch 1100, Monarch 1300, Monarch 1400, and so forth made by Cabot, Color Black FW1, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4, and so forth made by Degussa. These can be used singly or in combinations of two or more types.

Examples of the pigment used in a yellow ink composition include C.I. Pigment Yellow 1, 2, 3, 12, 13, 14, 16, 17, 73, 74, 75, 83, 93, 95, 97, 98, 109, 110, 114, 128, 129, 138, 150, 151, 154, 155, 180, and 185. Preferably, one type or a mixture of two or more types is selected from the group consisting of C.I. Pigment Yellow 74, 109, 110, 128, and 138.

Examples of the pigment used in a magenta ink composition include C.I. Pigment Red 5, 7, 12, 48 (Ca), 48 (Mn), 57 (Ca), 15:1, 112, 122, 123, 168, 184, 202, 209, and C.I. Pigment Violet 19. Preferably, one type or a mixture of two or more types is selected from the group consisting of C.I. Pigment Red 122, 202, 209 and C.I. Pigment Violet 19.

Examples of the pigment used in a cyan ink composition or light cyan ink composition include C.I. Pigment Blue 1, 2, 3, 15:3, 15:4, 15:34, 16, 22, 60, C.I. Vat Blue 4 and 60. Preferably, one type or a mixture of two or more types is selected from the group consisting of C.I. Pigment Blue 15:3, 15:4, and 60.

In a preferred aspect of the present invention, the pigment utilized in the present invention preferably has an average particle size between 10 and 200 nm, and even more preferably between 50 and 150 nm.

The amount in which the pigment is used in the present invention may be determined appropriately, but is 0.1 to 20 wt %, and preferably 0.2 to 10 wt %, in the ink composition.

The pigment content is appropriately adjusted according to the type of ink composition, such as whether the ink composition is dark or light. In particular, it is preferable for the pigment content in a light ink composition to be 0.1 to 1.3 wt %, and even more preferably 0.4 to 1.0 wt %.

In a preferred aspect of the present invention, the pigment utilized in the present invention is preferably added to the ink as a pigment dispersion obtained by dispersing the pigment in an aqueous solvent with a dispersant.

Favorable dispersants for the ink composition of the present invention include any dispersants, macromolecular dispersants, and surfactants commonly used to prepare pigment dispersions.

Examples of macromolecular dispersants that can be used to advantage in the present invention contain natural polymers, specific examples of which include glue, gelatin, casein, albumin, and other such proteins, gum arabic, tragacanth gum, and other such natural rubbers, saponin and other such glucosides, alginic acid and alginic acid propylene glycol ester, triethanolamine alginate, ammonium alginate, and other such alginic acid derivatives, and methyl cellulose, carboxymethyl cellulose, hydroxyethyl cellulose, ethyl hydroxycellulose, and other such cellulose derivatives.

Other favorable examples of macromolecular dispersants include synthetic polymers, such as polyvinyl alcohols, polyvinylpyrrolidones, polyacrylic acid, acrylic acid-acrylonitrile copolymers, potassium acrylate-acrylonitrile copolymers, vinyl acetate-acrylic ester copolymers, acrylic acid-alkyl acrylate copolymers, and other acrylic copolymers; styrene-acrylic acid copolymers, styrene-methacrylic acid copolymers, styrene-methacrylic acid-alkyl acrylate copolymers, styrene-a-methylstyrene-acrylic acid copolymers, styrene-a-methylstyrene-acrylic acid-alkyl acrylate copolymers, and other such styrene-acrylic acid resins; styrene-maleic acid; styrene-maleic anhydride; vinylnaphthalene-acrylic acid copolymers; vinylnaphthalene-maleic acid copolymers; vinyl acetate-ethylene copolymers, vinyl acetate-fatty acid vinyl ethylene copolymers, vinyl acetate-maleic ester copolymers, vinyl acetate-crotonic acid copolymers, vinyl acetate-acrylic acid copolymers, and other such vinyl acetate copolymers, and salts of these.

Of the above, it is particularly favorable to use macromolecular compounds having a carboxyl group (preferably in the form of a salt) (such as the above-mentioned styrene-acrylic acid resins, styrene-maleic acid resins, styrene-maleic anhydride resins, vinylnaphthalene-acrylic acid copolymers, vinylnaphthalene-maleic acid copolymers, and vinyl acetate-acrylic acid copolymers), copolymers of a monomer having a hydrophobic group and a monomer having a hydrophilic group, and polymers composed of a monomer having both a hydrophobic group and a hydrophilic group in its molecular structure.

Examples of the above-mentioned salts include salts of diethylamine, ammonia, ethylamine, triethylamine, propylamine, isopropylamine, dipropylamine, butylamine, isobutylamine, triethanolamine, diethanolamine, aminomethylpropanol, morpholine, and so forth. These (co)polymers preferably have an Mw of 3,000 to 30,000, and even more preferably 5,000 to 15,000.

Examples of surfactants favorable as a dispersant include fatty acid salts, higher alkoxydicarboxylates, higher alcohol sulfates, higher alkylsulfonates, condensates of a higher fatty acid and an amino acid, sulfosuccinates, naphthenates, liquid oil sulfates, alkylallylsulfonates, and other such anionic surfactants; fatty acid amine salts, quaternary ammonium salts, sulfonium salts, phosphonium [salts], and other such cationic surfactants; and polyoxyethylene alkyl ethers, polyoxyethylene alkyl esters, sorbitan alkyl esters, polyoxyethylene sorbitan alkyl esters, and other such nonionic surfactants. It will be understood by a person skilled in the art that function as a surfactant will also be achieved when the above surfactants are added to an ink composition.

In a preferred aspect of the present invention, the ink composition pertaining to the present invention further contains a 1,2-alkanediol. This 1,2-alkanediol is preferably 1,2-hexanediol.

The amount in which the 1,2-alkanediol is added may be appropriately determined, but about 1 to 15 wt % is preferable, and about 2 to 10 wt % is even better.

In a preferred aspect of the present invention, it is preferable to use a polyether-modified organosiloxane compound expressed by the following formula.

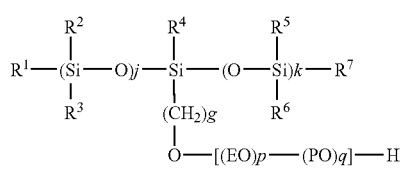

(1)

(where $R^1$ to $R^7$ are each independently a $C_1$ to $C_6$ alkyl group, j, k, and g are each independently an integer greater than or equal to 1, EO is an ethyleneoxy group, PO is a propyleneoxy group, p and q are integers greater than or equal to 0, p+q is an integer greater than or equal to 1, and EO and PO may be random or block regardless of their order within the brackets).

With the polyether-modified organosiloxane compound used in the present invention, preferably, in the above-mentioned General Formula 1, $R^1$ to $R^7$ are each independently a $C_1$ to $C_6$ alkyl group, and preferably a methyl group. j, k, and g are each independently an integer greater than or equal to 1, and preferably 1 or 2. p and q are integers greater than or equal to 0, and p+q is an integer greater than or equal to 1.

A compound that satisfies the equation j=k+1, for example, is favorable as the compound expressed by General Formula 1 above. It is also favorable for the compound expressed by General Formula 1 to be a compound in which $R^1$ to $R^7$ are all methyl groups, j is 2, k is 1, g is 1, p is an integer greater than or equal to 1, and q is 0.

Compounds expressed by General Formula 1 above are available commercially, and these products can be used. For instance, silicon-based surfactants BYK-345, BYK-346, BYK-347, and BYK-348, which are marketed by BYK-Chemie, can be utilized.

The amount in which the polyether-modified organosiloxane compound is added may be appropriately determined, but is preferably within a range of about 0.03 to 3 wt %, and even more preferably about 0.1 to 2 wt %, and better yet about 0.3 to 1 wt %, with respect to the ink composition.

In a preferred aspect of the present invention, the ink composition pertaining to the present invention contains a penetrant. Specific examples of favorable penetrants include glycol ethers and/or acetylene glycol-based surfactants.

Specific examples of glycol ethers include ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol monomethyl ether, dipropylene glycol monoethyl ether, dipropylene glycol mono-n-propyl ether, and dipropylene glycol mono-iso-propyl ether. These can be used singly or in mixtures of two or more types.

The amount in which the glycol ether is added is preferably between 1 and 20 wt %, and even more preferably between 2 and 15 wt %, with respect to the ink composition.

In a preferred aspect of the present invention, it is preferable to utilize an alkyl ether of a polyhydric alcohol, and particularly favorable to use ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, or triethylene glycol monobutyl ether. Best of all is triethylene glycol monobutyl ether.

The amount in which the alkyl ether of a polyhydric alcohol is added may be appropriately determined, but is preferable about 1 to 10 wt %, and even more preferably about 3 to 5 wt %.

Meanwhile, specific examples of favorable acetylene glycol-based surfactants that can be used in the present invention include compounds expressed by the following formula.

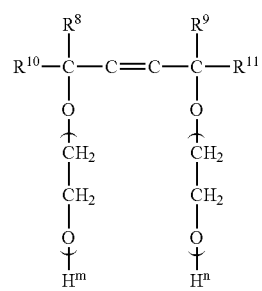

(2)

(In the formula, $0 \leq m+n \leq 50$, and $R^8$ to $R^{11}$ are each independently an alkyl group.)

Of the compounds expressed by General Formula 2 above, particularly favorable examples include 2,4,7,9-tetramethyl-5-decyne-4,7-diol, 3,6-dimethyl-4-octyne-3,6-diol, and 3,5-dimethyl-1-hexyn-3-ol. Commercially available products may also be used as the acetylene glycol surfactant expressed by General Formula 2, specific examples of which include Surfynol 104, 82, 465, 485, and TG (all available from Air Products and Chemicals, Inc.) and Olfine STG and Olfine E 1010 (trade names of Nissin Chemical).

The amount in which the acetylene glycol surfactant is added may be appropriately determined, but is preferably about 0.1 to 10 wt %, and even more preferably about 0.1 to 2 wt %, with respect to the ink composition.

The water used in the ink composition of the present invention can be ion exchanged water, ultrafiltered water, reverse osmosis water, distilled water, or other such purified water or ultrapure water. The use of water that has been sterilized by ultraviolet radiation, the addition of hydrogen peroxide, or the like is desirable because it prevents mold and bacteria from proliferating when the ink composition is stored for an extended period.

The water-soluble organic solvent is an organic solvent with a low boiling point, example of which include methanol, ethanol, n-propyl alcohol, iso-propyl alcohol, n-butanol, sec-butanol, tert-butanol, iso-butanol, and n-pentanol. A monohydric alcohol is particularly good. The effect of an organic solvent with a low boiling point is that it shortens the drying time of the ink.

The amount in which the low-boiling organic solvent is added is preferably about 5 wt % or less, and even more preferably about 2 wt % or less, with respect to the ink composition.

In a preferred aspect of the present invention, the ink composition pertaining to the present invention further contains a wetting agent composed of an organic solvent with a high boiling point. Examples of favorable high-boiling organic solvents include ethylene glycol, diethylene glycol, triethylene glycol, polyethylene glycol, polypropylene glycol, propylene glycol, butylene glycol, 1,2,6-hexanetriol, thioglycol, hexylene glycol, glycerol, trimethylolethane, trimethylolpropane, and other such polyhydric alcohols, and urea, 2-pyrrolidone, N-methyl-2-pyrrolidone, and 1,3-dimethyl-2-imidazolinone. These can be used singly or in mixtures of two or more types. Glycerol, triethylene glycol monobutyl ether, 2-pyrrolidone, ethylene glycol, diethylene glycol, triethylene glycol, polyethylene glycol, diethylene glycol monobutyl ether, and urea are particularly favorable.

The amount in which these are added is preferably about 1 to 20 wt %, and even more preferably about 5 to 10 wt %, with respect to the ink composition.

The ink composition pertaining to the present invention can further contain a surfactant. Examples of surfactants include anionic surfactants (such as sodium dodecylbenzene-sulfonate, sodium laurylsulfate, and an ammonium salt of polyoxyethylene alkyl ether sulfate) and nonionic surfactants (such as polyoxyethylene alkyl ethers, polyoxyethylene alkyl esters, sorbitan fatty acid esters, polyoxyethylene alkylphenyl ethers, polyoxyethylenealkylamines, and polyoxyethylenealkylamides). These can be used singly or in mixtures of two or more types.

The ink composition pertaining to the present invention can further contain anticlogging agents for the nozzle, preservatives, antioxidants, electroconductivity adjusters, pH adjusters, viscosity adjusters, surface tension adjusters, oxygen absorbents, and so forth.

Examples of preservatives and mildew retardants include sodium benzoate, sodium pentachlorophenol, sodium 2-pyridinethiol-1-oxide, sodium sorbinate, sodium dehydroacetate, and 1,2-dibenzenethiazolin-3-one (Proxel CRL, Proxel BDN, Proxel GXL, Proxel XL-2, and Proxal TN made by ICI).

Examples of pH adjusters, dissolution auxiliaries, and antioxidants include diethanolamine, triethanolamine, propanolamine, morpholine, and other such amines and modified products thereof, potassium hydroxide, sodium hydroxide, lithium hydroxide, and other such inorganic salts, ammonium hydroxide, quaternary ammonium hydroxide (such as tetramethylammonium), potassium carbonate, sodium carbonate, lithium carbonate, and other such carbonates or phosphates and the like, as well as N-methyl-2-pyrrolidone, urea, thiourea, tetramethylurea, and other such ureas, allophanate, methyl allophanate, and other such allophanates, biuret, dimethylbiuret, tetramethyldimethylbiuret, and other such dimethylbiurets, and L-ascorbic acid and salts thereof.

The ink composition pertaining to the present invention can contain antioxidants and ultraviolet absorbents, examples of which include Ciba-Geigy Tinuvin 328, 900, 1130, 384, 292, 123, 144, 622, 770, and 292, Irganox 1010, 1076, 1035, MD1024, and oxides of lanthanides.

Method for Manufacturing Ink Composition

The ink composition of the present invention can be manufactured by dispersing and mixing the above components by a suitable method. Preferably, first a pigment, a macromolecular dispersant, and water are mixed in a suitable disperser (such as a ball mill, sand mill, attriter, roll mill, agitator mill, Henschel mixer, colloid mill, ultrasonic homogenizer, jet mill, or Angmill) to prepare a uniform pigment dispersion, and then a separately prepared sulfonated copolymer (referred to as "emulsion" in the examples), water, a water-soluble organic solvent, a saccharide, a pH adjuster, a preservative, a mildew retardant, and so forth are added and thoroughly dissolved to prepare an ink solution. After the system has been thoroughly stirred, it is filtered to remove any foreign matter or coarse particles that could cause clogging. This produces the targeted ink composition.

Recording Method

The present invention provides a recording method with which the above-mentioned ink composition is used to form an image on a recording medium.

Because an ink composition constituted as above is used with the recording method of the present invention, it is possible to form a printed image with excellent gas resistance, bronzing resistance, and fixability.

The recording method of the present invention can be applied to a variety of recording media, with no particular restrictions on the recording medium on which the image is formed.

Recorded Matter

The present invention also provides recorded matter comprising an image formed on a recording medium using the above-mentioned ink composition.

Because it is produced using an ink composition constituted as above, the recorded matter of the present invention has a printed image with excellent gas resistance, bronzing resistance, and fixability.

Examples of the recorded matter of the present invention include one having a printed image with excellent print quality as discussed above on ordinary paper, and one having a printed image with excellent print quality as discussed above on glossy paper.

EXAMPLE 1

The present invention will now be described in further detail by giving examples, etc., but the present invention is not limited to or by these examples.

In the following description, all percentages are by weight unless otherwise specified.

Preparation of Emulsion (1) Emulsion 1

An emulsion having the following composition was prepared by the following procedure. First, 100 g of dioxane was put in a glass reaction vessel, 11.8 g of sulfuric anhydride was added to this while the internal temperature was held at 25° C., and the system was stirred for 2 hours to obtain a sulfuric anhydride-dioxane complex.

Next, the full amount of the above-mentioned sulfuric anhydride-dioxane complex was added to a tetrahydrofuran (THF) solution (15% concentration) of 100 g of an isoprene/styrene/isoprene ternary block copolymer (30/40/30 weight ratio, molecular weight of 10,000) while the internal temperature was held at 25° C., and stirring was continued for another 2 hours.

After this, 1200 g of water, 7.1 g of sodium hydroxide, and 1 g of sodium dodecylbenzenesulfonate were put in a flask, and the internal temperature was maintained at 40° C. The full amount of the above-mentioned sulfonated diene-based copolymer solution was added dropwise to this flask over a period of 1 hour while the internal temperature was held at 40° C. The system was stirred for 2 hours at 40° C. upon completion of the dropping, after which the solvent was removed by reduced pressure distillation (leaving the water behind) to obtain a sulfonated diene-based sulfonic acid group-containing emulsion with a concentration of 15% (hereinafter also referred to as "emulsion 1"). The average particle size of this emulsion 1 was 30 nm, and the sulfonic acid content in the solids was 1.1 mmol/g.

(2) Emulsion 2

A sulfonated diene-based copolymer emulsion (hereinafter also referred to as "emulsion 2") was obtained by the same procedure as in the preparation of emulsion 1, except that isoprene/styrene/isoprene (20/60/20 weight ratio, molecular weight of 10,000) was used for the ternary block copolymer. The average particle size of this emulsion 2 was 40 nm, and the sulfonic acid content in the solids was 1.8 mmol/g.

(3) Emulsion 3

A sulfonated diene-based copolymer emulsion (hereinafter also referred to as "emulsion 3") was obtained by the same procedure as in the preparation of emulsion 1, except that styrene/isoprene/styrene (10/80/10 weight ratio, molecular weight of 10,000) was used for the ternary block copolymer.[5] The average particle size of this emulsion 3 was 30 nm, and the sulfonic acid content in the solids was 1.2 mmol/g.

(4) Emulsion 4

A sulfonated diene-based copolymer emulsion (hereinafter also referred to as "emulsion 4") was obtained by the same procedure as in the preparation of emulsion 1, except that isoprene/styrene/isoprene (10/80/10 weight ratio, molecular weight of 10,000) was used for the ternary block copolymer.[5] The average particle size of this emulsion 4 was 30 nm, and the sulfonic acid content in the solids was 1.2 mmol/g.

(5) Emulsion 5

A sulfonated diene-based copolymer emulsion (hereinafter also referred to as "emulsion 5") was obtained by the same procedure as in the preparation of emulsion 1, except that butadiene/styrene/butadiene (30/40/30 weight ratio, molecular weight of 10,000) was used for the ternary block copolymer.[5] The average particle size of this emulsion 5 was 40 nm, and the sulfonic acid content in the solids was 1.0 mmol/g.

The polymerization ratios of the ternary block copolymers,[5] the average particle sizes, and the sulfonic acid contents in the solids are given for the various emulsions in the following table.

TABLE 1

| Emulsion | Weight ratio | | Aver. particle size (nm) | Sulfonic acid content (mmol) |
|---|---|---|---|---|
| 1 | IP/St/IP | 30/40/30 | 30 | 1.1 |
| 2 | | 20/60/20 | 40 | 1.8 |
| 3 | St/IP/St | 10/80/10 | 30 | 1.2 |
| 4 | IP/St/IP | 10/80/10 | 30 | 1.2 |
| 5 | BD/St/BD | 30/40/30 | 40 | 1.0 |

IP: isoprene,
BD: butadiene,
St: styrene

Preparation of Water-Based Pigment Ink Composition for Ink Jet Recording (1) EXAMPLE 1

A pigment ink composition having the following composition was prepared by the following procedure. 25.0 wt % C.I. Pigment Blue 15:3 (used as a coloring pigment) was thoroughly mixed into 13.2 wt % an ammonium salt of a styrene-acrylic acid copolymer (molecular weight of 7000, polymer component 38%, used as a dispersant) and 61.8 wt % water (used as a solvent), after which this mixture was dispersed for 2 hours in a sand mill (made by Yasukawa Seisakusho) along with glass beads (1.7 mm diameter, 1.5 times the amount (by weight) of the mixture). After this dispersal, the glass beads were removed to obtain a pigment dispersion. Separately, a vehicle was prepared from all the following ingredients except for the pigment dispersion, and this vehicle was gradually added dropwise to the above-mentioned pigment dispersion under thorough stirring. The mixture was filtered through a 5 μm membrane filter to obtain a water-based pigment ink composition for ink jet recording.

| | |
|---|---|
| 1pigment dispersion | 16.0% |
| BYK 347 | 0.5% |
| 1,2-hexanediol | 10.0% |
| glycerol | 10.0% |
| triethanolamine | 1.0% |
| emulsion 1 | 6.7% |
| pure water | balance |

(2) EXAMPLE 2

The desired ink composition was prepared in the same manner as in Example 1, except that emulsion 2 was added in the preparation of the ink composition.

(3) COMPARATIVE EXAMPLE 1

The desired ink composition was prepared in the same manner as in Example 1, except that emulsion 3 was added in the preparation of the ink composition.

(4) COMPARATIVE EXAMPLE 2

The desired ink composition was prepared in the same manner as in Example 1, except that emulsion 4 was added in the preparation of the ink composition.

(5) COMPARATIVE EXAMPLE 3

The desired ink composition was prepared in the same manner as in Example 1, except that emulsion 5 was added in the preparation of the ink composition.

TEST EXAMPLE 1

Light Resistance Evaluation

A light resistance evaluation was conducted as follows, using the cyan ink compositions of Examples 1 and 2 and Comparative Examples 1 and 2. Printing was performed using an ink jet printer (PM-920C made by Seiko Epson) with the printing duty adjusted so that the optical density (OD) would be between 0.9 and 1.1. The printed matter thus obtained was exposed for 1200 hours under conditions of 24° C. and 60% relative humidity using a Ci5000 Xenon Weather-Ometer (trade name of Atlas).

The OD of each printed matter after exposure was measured with a density gauge (Spectrolino made by Gretag), and the residual optical density (ROD) was calculated from the following equation.

$$ROD\ (\%)=(D/D_0)\times 100$$

(Measurement conditions: filter: red; light source: D50; angle of visibility: 2 degrees)

In the above equation, D is the OD value after the exposure test, and $D_0$ is the OD value prior to the exposure test. The grading criteria were as follows.

Grade A: ROD of at least 90%
Grade B: ROD of at least 70%, but less than 90%
Grade C: ROD of less than 70%

TEST EXAMPLE 2

Gas Resistance Evaluation

A gas resistance evaluation was conducted as follows, using the cyan ink compositions of Examples 1 and 2 and Comparative Examples 1 and 2. Printing was performed using an ink jet printer (PM-920C made by Seiko Epson) with the printing duty adjusted so that the optical density (OD) would be between 0.9 and 1.1. The printed matter thus obtained was exposed for 12 hours under conditions of 24° C. and 60% relative humidity using an Ozone Weather Meter model OMS-H (trade name of Suga Test Instruments).

The L*, a*, and b* of each printed matter after exposure were measured with a density gauge (Spectrolino made by Gretag), and the color change (ΔE) was calculated from the following equation.

$$\Delta E^*=\{(\Delta L^*)^2+(\Delta a^*)^2+(\Delta b^*)^2\}^{1/2}$$

In this equation, ΔL*, Δa*, and Δb* indicate the respective difference in the L*, a*, and b* coordinates of the L*a*b* color system before and after ozone treatment. The grading criteria were as follows.

Grade A: good gas resistance (ΔE*<10)
Grade B: no practical problem (10≦ΔE*<20)
Grade C: impractical (20<ΔE*)

TEST EXAMPLE 3

Fixability Evaluation (1) Fixability Evaluation 1: Abrasion Resistance (Evaluation by Rubbing With Finger)

An abrasion resistance evaluation was conducted as follows, using the cyan ink compositions of Examples 1 and 2 and Comparative Examples 1 and 2. Printing was performed using an ink jet printer (PM-920C made by Seiko Epson) on PM Photographic Paper (special ink jet paper made by Seiko Epson). 3 minutes after this printing, the surface of the printed matter was rubbed with a finger, and the abrasion resistance was visually evaluated from the extent of colorant separation. The grading criteria were as follows.

Grade A: no colorant separation whatsoever
Grade B: very little colorant separation (less than 20% of the total colorant)
Grade C: separation of colorant (at least 20% of the total colorant)

(2) Fixability Evaluation 2: Scratch Resistance

A scratch resistance evaluation was conducted as follows, using the cyan ink compositions of Examples 1 and 2 and Comparative Examples 1 and 2. Specifically, printing was performed using an ink jet printer (PM-920C made by Seiko Epson) on PM Photographic Paper (special ink jet paper made by Seiko Epson). 3 minutes after this printing, the print medium was rubbed with a fingernail, and the scratch resistance was visually evaluated from whether or not the surface of the recorded matter was scratched. The grading criteria were as follows.

Grade A: no scratching of the recorded matter surface
Grade B: recorded matter surface was scratched, but no colorant separation
Grade C: recorded matter surface was scratched, and colorant separation also occurred

TEST EXAMPLE 4

Bronzing Resistance Evaluation

A bronzing resistance evaluation was conducted as follows, using the cyan ink compositions of Examples 1 and 2 and Comparative Examples 1 and 2. Specifically, printing was performed using an ink jet printer (PM-920C made by Seiko Epson) on PM Photographic Paper (special ink jet paper made by Seiko Epson) at printing duties of 20%, 40%, 60%, 80%, and 100%. The samples were then viewed from various angles, and the bronzing resistance was evaluated according to the following grading criteria.

Grade A: no bronzing, or almost unnoticeable, at any printing duty
Grade B: bronzing noted at 1 or 2 printing duties
Grade C: bronzing noted at 3 or more printing duties Evaluation Results The evaluation results for the ink compositions of the various examples are given in the following table.

TABLE 2

| Ex. C.E. | Test Ex. 1 (light resistance) | Test Ex. 2 (gas resistance) | Test Ex. 3 (fixability) | | Test Ex. 4 (bronzing resistance) |
|---|---|---|---|---|---|
| | | | Abrasion resistance | Scratch resistance | |
| Ex. 1 | A | A | A | A | A |
| Ex. 2 | A | A | A | A | A |
| C.E. 1 | A | B | A | A | B |
| C.E. 2 | B | B | B | B | A |
| C.E. 3 | A | B | B | B | A |

[C.E.: Comparative Example]

What is claimed is:

1. An ink composition in which a pigment is dispersed in a solvent, and comprising a copolymer that contains structural units originating in an aromatic compound monomer and structural units originating in a $C_5$ or higher diene compound and structural units originating in a non-diene compound, wherein the copolymer has a sulfonic acid group, and the proportion of structural units originating in the aromatic compound monomer is 30 to 60 wt % with respect to the weight of the copolymer (100 wt %).

2. The ink composition according to claim 1, wherein the aromatic compound monomer is selected from the group consisting of styrene, α-methylstyrene, o-methylstyrene, p-methylstyrene, m-methylstyrene, chlorostyrene, and vinyl benzoate.

3. The ink composition according to claim 1, wherein the copolymer is contained as an emulsion.

4. The ink composition according to claim 1, wherein the non-diene compound is an acrylic compound.

5. The ink composition according to claim 1, wherein the pigment is dispersed in a solvent by a macromolecular compound having a carboxyl group.

6. The ink composition according to claim 5, wherein the macromolecular compound having a carboxyl group is a styrene-acrylic acid resin.

7. The ink composition according to claim 1, further containing a 1,2-alkanediol.

8. The ink composition according to claim 7, wherein the 1,2-alkanediol is 1,2-hexanediol.

9. The ink composition according to claim 7, wherein the 1,2 alkanediol is contained in an amount of 1 to 15 wt %.

10. The ink composition according to claim 1, further containing a polyether-modified organosiloxane compound.

11. The ink composition according to claim 10, wherein the polyether-modified organosiloxane compound is expressed by the following formula:

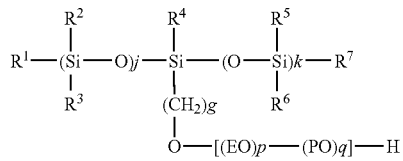

(1)

where $R^1$ to $R^7$ are each independently a $C_1$ to $C_6$ alkyl group, j, k, and g are each independently an integer greater than or equal to 1, EO is an ethyleneoxy group, PO is a propyleneoxy group, p and q are integers greater than or equal to 0, p+q is an integer greater than or equal to 1, and EO and PO may be random or block regardless of their order within the brackets.

12. The ink composition according to claim 1, further containing an alkyl ether of a polyhydric alcohol.

13. The ink composition according to claim 12, wherein the alkyl ether of a polyhydric alcohol is selected from the group consisting of ethylene glycol mono ethyl ether, ethylene glycol monobutyl ether, diethylene glycol monomethyl ether, diethylene glycol mono ethyl ether, diethylene glycol monobutyl ether, triethylene glycol monomethyl ether, triethylene glycol monoethyl ether, and triethylene glycol monobutyl ether.

14. The ink composition according to claim 12, wherein the alkyl ether of a polyhydric alcohol is triethylene glycol monobutyl ether.

15. The ink composition according to claim 1, further containing an acetylene glycol-based surfactant.

16. The ink composition according to claim 15, wherein the acetylene glycol-based surfactant is expressed by the following formula:

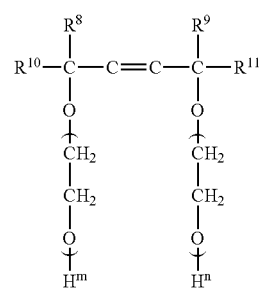

(2)

where $0 \leq m+n \leq 50$, and $R^8$ to $R^{11}$ are each independently an alkyl group.

17. A recording method, comprising the step of applying the ink composition according to claim 1 to a recording medium so as to form an image.

18. Recording matter produced by forming an image by applying the ink composition according to claim 1 to a recording medium.

* * * * *

UNITED STATES PATENT AND TRADEMARK OFFICE
CERTIFICATE OF CORRECTION

PATENT NO.        : 7,153,893 B2  
APPLICATION NO. : 10/688837  
DATED             : December 26, 2006  
INVENTOR(S)      : Hiroaki Segawa et al.

It is certified that error appears in the above-identified patent and that said Letters Patent is hereby corrected as shown below:

Title Page
    On title page, item *, "253" should read -- 261 -- and insert -- (30) Foreign Application Priority Data  Oct. 22, 2002  (JP)  ................... 2002-302078   Oct. 16, 2003   (JP)  ................... 2003-356273 --.

Signed and Sealed this

Thirteenth Day of March, 2007

JON W. DUDAS  
*Director of the United States Patent and Trademark Office*